United States Patent [19]

Yanai

[11] Patent Number: 4,994,137

[45] Date of Patent: Feb. 19, 1991

[54] BAG MAKING MACHINE SEALER SLITTER APPARATUS

[75] Inventor: Takeo Yanai, Tokeo, Japan

[73] Assignee: Nippon Flute Co., Ltd., Saitama, Japan

[21] Appl. No.: 380,105

[22] Filed: Jul. 14, 1989

[30] Foreign Application Priority Data

Jul. 14, 1989 [JP] Japan .................................. 63-175547

[51] Int. Cl.$^5$ .............................................. B32B 31/20
[52] U.S. Cl. ..................................... 156/515; 493/203; 493/206; 493/209; 493/470
[58] Field of Search ............... 493/194, 203, 205, 206, 493/208, 209, 341, 470; 156/515

[56] References Cited

U.S. PATENT DOCUMENTS

| | | | |
|---|---|---|---|
| 2,711,779 | 6/1955 | Carland | 156/515 |
| 3,384,528 | 5/1968 | Lehmacher et al. | 156/515 |
| 3,574,039 | 4/1971 | Fehr et al. | 493/203 |
| 3,775,225 | 11/1973 | Schott, Jr. | 156/583.1 |
| 3,940,305 | 2/1976 | Stenberg | 493/203 |
| 4,767,482 | 8/1988 | Diez et al. | 156/515 |
| 4,872,942 | 10/1985 | Sharps, Jr. et al. | 156/515 |

Primary Examiner—William E. Terrell
Assistant Examiner—S. Keating Johns
Attorney, Agent, or Firm—Bradford E. Kile

[57] ABSTRACT

A bag making machine sealer slitter apparatus for transversely sealing together and severing two layers of a tubular web of thermoplastic resin film, thereby forming a bag wherein the sealer slitter apparatus essentially comprising a sealing mans having two opposing seal bars equipped with heaters and a severing means including a retractable, superheated cutting edge.

6 Claims, 3 Drawing Sheets

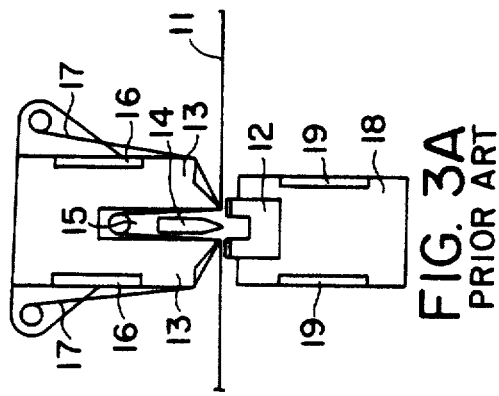
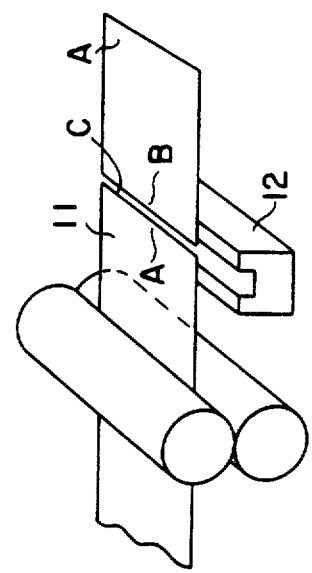
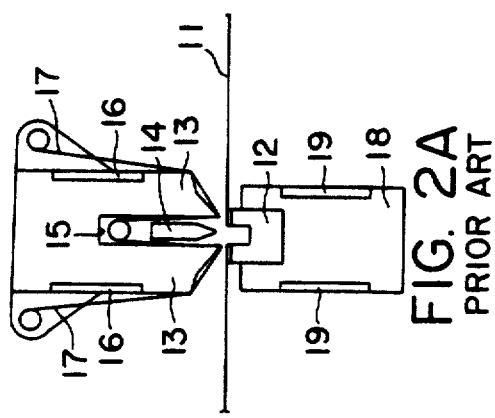
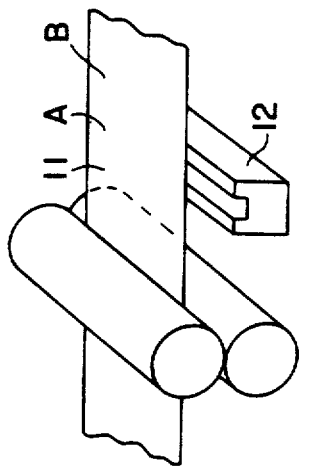
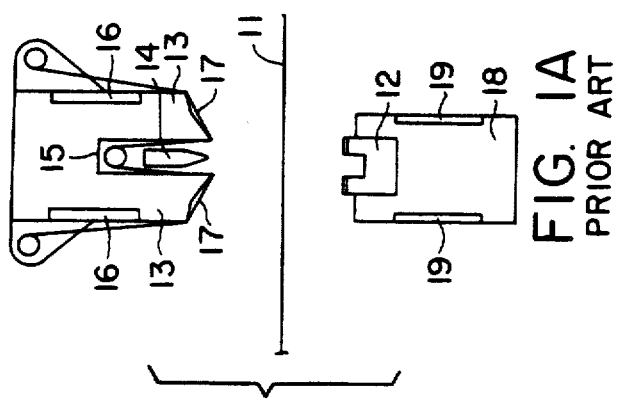
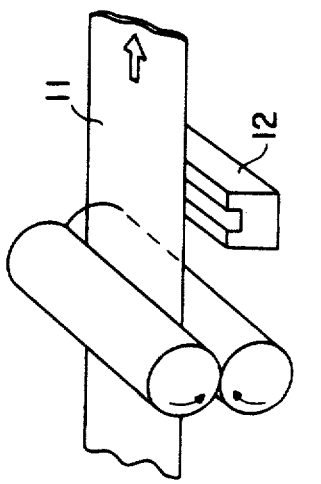

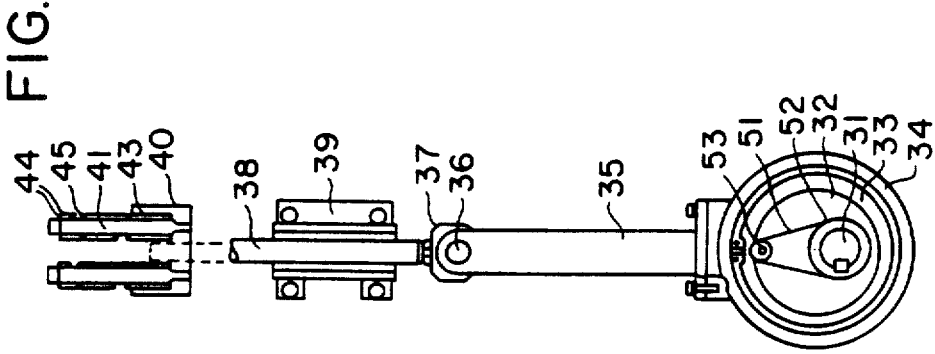

BAG MAKING MACHINE SEALER SLITTER APPARATUS

BACKGROUND OF THE INVENTION

This invention relates to a novel bag making machine sealer slitter apparatus. More specifically, this invention relates to a sealer slitter apparatus which transversely seals together and severs two layers of a tubular web of thermoplastic resin film, thereby forming a bag.

Thermoplastic resin bags, such as those used in supermarkets, convenience stores, etc. are produced from a long tubular web of thermoplastic synthetic resin film. The tubular web, which is unrolled from a spool, is intermittently fed into a bag making machine where heat is transversely applied to the web in order to form a weld seal between the two layers of the web. A cutting edge intersects and transversely severs the web adjacent the seal in order to complete formation of a bag.

The sealing and severing apparatus of a bag making machine usually includes a metallic lower stationary seal bar and a corresponding metallic movable upper seal bar. One of the first bag making machines heats one of the seal bars to produce enough heat to melt the thermoplastic web when held between the two seal bars. The cutting edge is positioned adjacent to the movable upper seal bar. When the web is stopped, the cutting edge and the upper seal bar advance together toward the lower seal bar. The web is sealed and severed to produce two separate portions, a leading portion being the bottom of a newly formed bag and a trailing portion being the top of the next bag to be formed.

A problem is often encountered with the above described configuration in that a melted thermoplastic web tends to adhere to the legs of the metallic seal bars. Interruption of the machine cycle is intermittently necessary to clean the seal bars. The advent of a low friction coefficient, heat stable material, such as tetrafluoroethene which is commercially known as Teflon, allowed the web to be sealed without adhering to the seal bars. By coating the surfaces of the seal bars with Teflon, the frequency of interruption of a bag making machine cycle to clean the seal bars was reduced, and overall efficiency was thus increased.

However, production capacity was still limited by difficulties associated with bag cutting operations. In this connection, over time, the cutting edge became blunted, and the bag making machine cycle would be interrupted in order to replace the cutting edge. The integrity of a severed bag edge was also frequently poor due to the elastic property of a thermoplastic web, which is not easily severed from a direction normal to the length of the web.

The effectiveness of the cutting edge was enhanced by heating the cutting edge or knife and thereby allowing both heat and the physical action of the cutting edge to sever the web. However, introduction of heat to the cutting edge encourages adherence of the thermoplastic film or carbon deposits to the cutting edge. A carbon by-product of the thermoplastic film blunts the cutting edge and decreases the sharpness of the severed edge, or kerf, of the thermoplastic film. Unlike the seal bars, the cutting edge is not covered with Teflon because a sharp cutting edge would be difficult to achieve. Therefore, the bag making machine cycle must be interrupted and the cutting edge must be polished in order to remove the carbon by-product. Interruption of the machine cycle again results in a decreased production rate of thermoplastic resin bags.

The difficulties suggested in the preceeding are not intended to be exhaustive but rather are among many which may tend to reduce the effectiveness of and product quality associated with present bag making machine sealing and slitting devices. Other noteworthy problems may also exist; however, those presented above should be sufficient to demonstrate that sealing and slitting devices for bag making machines appearing in the past will admit to worthwhile improvement.

OBJECTS AND BRIEF SUMMARY OF THE INVENTION

Objects

It is therefore a general object of the invention to provide a novel bag making machine sealer slitter apparatus which will obviate or minimize difficulties of the type previously described.

It is a specific object of the invention to provide a bag making machine sealer slitter apparatus which will minimize the frequency of interruption of a bag making operation.

It is another object of the invention to provide a bag making machine sealer slitter apparatus which will increase the effectiveness of a cutting edge operable to sever a tubular web of thermoplastic resin film.

It is still another object of the invention to provide a bag making machine sealer slitter apparatus which will minimize the effect of by-products of a thermoplastic resin film which tend to adhere to a heated cutting edge during severance of a web of thermoplastic resin film.

It is a further object of the invention to provide a bag making machine sealer slitter apparatus which will not degrade the integrity of a transverse seal of opposing layers of a tubular web of thermoplastic resin film after a seal has been formed.

It is yet a further object of the invention to provide a bag making machine sealer slitter apparatus which allows the sealing bars to maintain a relatively constant temperature.

It is still a further object of the invention to provide a bag making machine which encourages parallel severance of a web of thermoplastic resin film with respect to previously formed transverse weld beads.

Brief Summary of a Preferred Embodiment of the Invention

A preferred embodiment of the invention which is intended to accomplish at least some of the foregoing objects comprises a bag making machine having a novel sealing means and severing means. The sealing means comprise a stationary lower seal bar equipped with heaters and an upper movable seal bar, also equipped with heaters, positioned above the stationary lower seal bar. A tubular web of thermoplastic resin film is operably fed between the lower and upper seal bars in a bag making operation.

The severing means includes a cutting edge heated by a heater within the cutting edge, which is positioned adjacent the movable upper seal bar. In order to remove the carbon by-product of the thermoplastic film which adheres to the cutting edge, the cutting edge is heated to a degree which allows for combustion and self removal of the carbon byproduct from the cutting edge. The temperature necessary to combust the carbon by-product is much greater than the operable temperature of the seal bars.

The stationary lower seal bar may be configured as a single transverse bar or a pair of transverse bars which form a "U" shape. A single bar forms a transverse seal on one end of a bag, while a "U" shaped lower seal bar transversely seals both the top and bottom of sequential bags, forming what is commonly known as "T-shirt" bags. Mutually opposing movable upper seal bars descend toward and contact the stationary lower seal bar, melting the web held between the two bars and forming a transverse seal.

The upper seal bar is coated with a Teflon tape which is independently provided from the upper seal bar. The Teflon tape may be replaced as needed without removing the entire upper seal bar. The lower seal bar is coated with Teflon.

Heat transfer to the movable upper seal bar from the heated cutting edge must be avoided because the integrity of the transverse seal of the thermoplastic web will be adversely affected by upper seal bars which are excessively hot. Therefore, during advancement of the thermoplastic web and accompanying vertical retraction of the movable upper seal bar, the cutting edge is vertically recessed above the movable upper seal bar in order to minimize heat transfer.

In the "U" shaped seal bar configuration, the cutting edge is vertically recessed between the two upper movable seal bars. To maintain machine efficiency, the sealing and severing operations occur essentially simultaneously. Because the cutting edge is recessed above the movable seal bar, the cutting edge must descend toward the stationary lower seal bar faster than the movable upper seal bar. The sealing and severing means are therefore driven by separate reciprocating mechanisms. The reciprocating mechanisms include spring biased members which encourage vertical upward movement o upper seal bar and cutting edge.

Guide plates are provided on inner lateral surfaces of the "U" shaped movable upper seal bars to insure that the cutting edge transversely severs the thermoplastic web substantially parallel to the transverse weld beads formed by the sealing means.

THE DRAWINGS

Other objects and advantages of the present invention will become apparent from the following detailed description of a preferred embodiment thereof taken in conjunction with the accompanying drawings, wherein:

FIGS. 1(A), 2(A), and 3(A) comprise a sequence of schematic views illustrating operation of a method for sealing and slitting a thermoplastic web as known in the prior art;

FIGS. 1(B), 2(B), and 3(B) are views of a lower seal bar of the present invention adjacent to advancement means of the prior art and illustrate the sequence of sealing and slitting a thermoplastic web in accordance with FIGS. 1(A), 2(A), and 3(A);

FIG. 7 is detailed side view of the present invention illustrating a reciprocating assembly for both the sealing and slitting means of the sealer slitter apparatus; and FIG. 8 is a cross-sectional detailed view of an upper seal bar reciprocating mechanism, as taken along section line II—II in FIG. 7.

DETAILED DESCRIPTION

Context of the Invention

Figure 6:
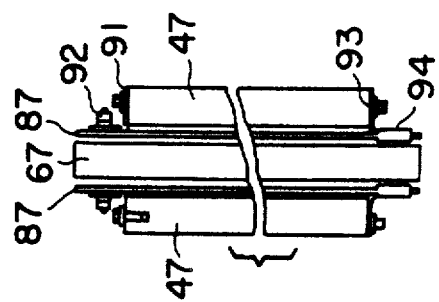
FIG. 6 is a plan view of the mounting portion of a sealing cover guide plate of the present invention.

An understanding of the operative context of the present invention will be facilitated by referring to FIGS. 1, 2, and 3, which disclose a sealer slitter apparatus of the prior art. As shown particularly in section (A) of FIGS. 1, 2, and 3, a movable upper seal bar 13, coated with a sealing preventive cover 17, is vertically retracted from a thermoplastic web 11. A heater 16 heats the upper seal bar 13, and a knife 14 is positioned between integrally connected legs of the upper seal bar 13. A lower support 18, positioned below the upper seal bar 13, includes a heater 19 which heats a lower seal bar 12.

In operation, as shown in corresponding sections (A) and (B) of FIGS. 1, 2, and 3, a bag making machine feeds the thermoplastic web 11 a predetermined length between the upper 13 and lower 12 seal bars. The thermoplastic web is then stopped, and the upper seal bar 13 descends toward the lower seal bar 12, as shown in FIG. 2(B), to form two seal welds A and B. As shown in FIGS. 3(A) and 3(B), the knife 14 further lowers between the seal welds A and B to sever the thermoplastic tube at kerf C. The upper seal bar 13 and the knife 14 then vertically retract, and the web is then advanced the length of a bag, and the sealing and severing process is repeated.

Sealer Slitter Apparatus

Figure 4:
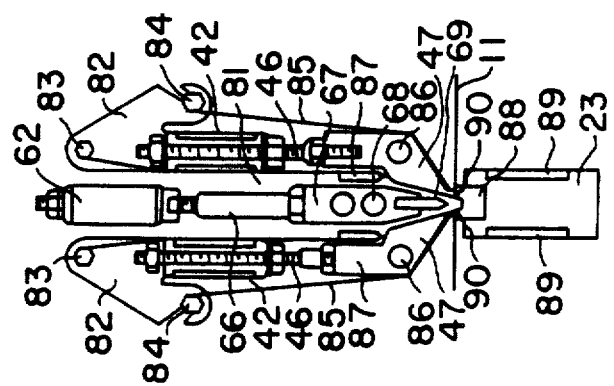
FIG. 4 is a front view of the subject sealer slitter apparatus showing the sealing and slitting means advanced toward a thermoplastic web.

Referring now specifically to FIG. 4, there will be seen a side view of a sealer slitter apparatus in accordance with a preferred embodiment of the subject invention. More particularly, a stationary lower seal bar 88 is shown positioned below first and second, movable, upper seal bars 47. A cutting edge 69 is positioned between and reciprocates with the first and second, movable, upper seal bars 47. A thermoplastic web 11 operably lies between the lower 88 and upper pair of seal bars 47. FIG. 4 illustrates the operable positions of the various components of the subject sealer slitter apparatus when the thermoplastic web 11 is simultaneously sealed and severed.

Each of the movable upper seal bars 47 is separately provided through the heated edge moving space 81. The cutting edge 69 vertically reciprocates between and concurrently with the upper seal bars 47. A sealing cover 85 prevents adhesion of a partially melted thermoplastic resin film 11 to the surfaces of the lower 88 and upper 47 seal bars.

A heater 86 is provided within the legs of the upper seal bar 47 to allow conduction of heat to the lower surfaces of the first and second upper seal bars 47. A heater support 67 is connected to the cutting edge 69 and also includes a heater 68 which allows conduction of heat to the cutting edge 69. A guide plate 87 is provided on the inner surface of each of the legs of the upper seal bars 47 in order to prevent the sealing cover 85 from coming into contact with the heater support 67.

The heater 86 provides sufficient heat to the upper seal bar 47 to allow a high integrity seal to be imparted to the thermoplastic web 11 when the thermoplastic web is between and in contact with the upper 47 and lower 88 seal bars. The heater 68 heats the cutting edge 69 to a much greater degree than that of the upper seal bars 47 so that any carbon by-products of the thermoplastic resin film which may have adhered to the cutting edge will be removed from the cutting edge 69 by combustion.

A support beam 42 for the movable upper seal bars 47 is provided with a bracket 82. An upper sealing bar cover, winding rod 83 and lower sealing bar cover winding rod 84 are spanned behind guide plates 87 and around the legs of the upper seal bars 47. The upper seal bars 47 are coated with a sealing cover in order to minimize adherence of a thermoplastic resin film 11 on any portion of the surface of the upper seal bars 47. The sealing preventive cover 85 may be a tetrafluoroethene film such as that sold under the trademark Teflon.

A fixed holder 23 supports the concave lower seal bar 88 and also supports heaters 89, which are positioned on the side of the fixed holder 23. The heaters provide heat which conducts to the surface of the lower seal bar 88 and melts the thermoplastic web 11 when the web 11 is engaged between the upper 47 and lower 88 seal bars. A sealing preventive tape 90, also composed of Teflon, adheres to the upper surface of the lower seal bar 88 and prevents adherance of the thermoplastic resin film 11 to the surface of the lower seal bar 88.

Figure 5:
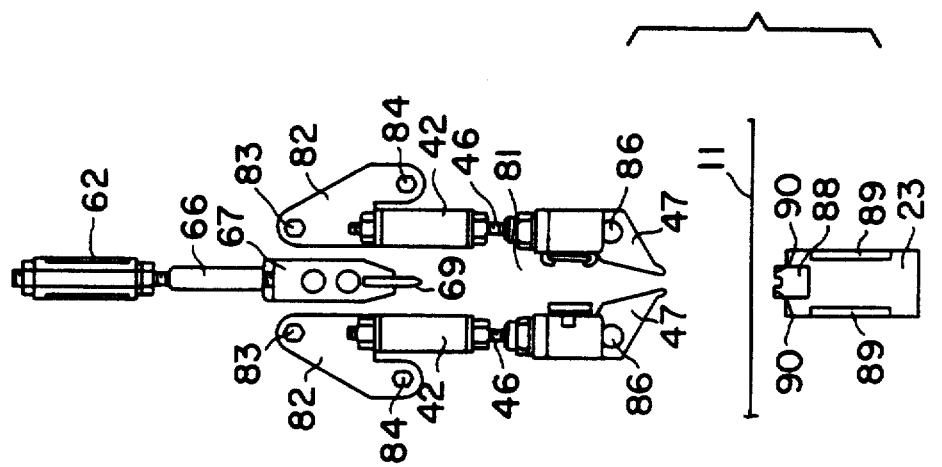
FIG. 5 is a front view of the subject sealer slitter apparatus showing the sealing and slitting means retracted from the thermoplastic web.

FIG. 5 illustrates another novel feature of the present invention. The cutting edge 69 is vertically recessed away from a lower edge portion of each of the upper seal bars 47 so that radiant heat transfer from the cutting edge 69 to the upper seal bar 49 does not occur when the thermoplastic web 11 advances. The integrity of a transverse weld bead imparted to the thermoplastic web is dependent upon a relatively constant seal bar temperature.

Referring particularly to FIG. 7, the fixed sealing bar holder 23 is mounted to the inside surface of a main body plate 21 through a bracket 22. A pair of main body plates 21 and brackets 22 are positioned on both the left and right sides of the upper seal bar 47. However, FIG. 7 shows only one side and omits the structure of the other side. The two sides are symmetrically identical.

The present invention includes an upper seal bar reciprocating mechanism 24 and a cutting edge reciprocating mechanism 25. Both the upper seal bar 24 and cutting edge 25 reciprocating mechanisms are connected to and driven by a bag making machine.

In the upper seal bar reciprocating mechanism 24, a main spindle 31, driven for rotation, is integrally fitted with an eccentric boss 32. A joint ring 34 is pivotally fitted to the eccentric boss 32 through bearing 33. A rod 35 is connected to the joint ring 34 and a guide rod 38 is connected to the upper end of the rod 35 through a spherical bearing joint 37 mounted by a pin 36. The guide rod 38 is held within a housing 39, mounted to the main body plate 21, by a bearing 39a to allow for vertical reciprocation of the guide rod 38.

A bracket 40 is secured to the upper end of the guide rod 38, and a guide rod 41 is integrally mounted to the bracket 40 so that the guide rod 38 vertically stands apart from the guide rod 41. Both ends of the support beam 42 are fitted to the guide rod 41 so that the two ends 43 can vertically reciprocate. Both ends 43 are resiliently biased to the bracket 40 by means of a compression coil spring 45 provided between the guide rod 41 and a nut 44 which is thread-mounted to the upper end of guide rod 41. The upper seal bar 47 is connected to the support beam 42 through a plurality of adjusting bolts 46 positioned beneath the support beam 42.

As seen in FIG. 8, and supplemented by FIG. 7, when an eccentric boss 32 is rotated together with a main spindle 31, a joint ring 34 makes a circular motion within the eccentric boss 32 and with the main spindle 31 as a radius. Accordingly, a crank-piston motion is transferred from the joint ring 34 to the guide rod 38 through the rod 35, causing the guide rod 38 to move vertically and the upper seal bar 47 to move vertically through the support beam 42. When the upper seal bar 47 is lowered midway between its two extremes of excursion, a compression motion occurs in the spring 45, generating a biasing force at the tip of the upper seal bar 47.

In the cutting edge reciprocating mechanism 25, an end boss 52 of arm 51 is integrally connected to the main spindle 31. A shaft 53 is provided at the tip of the arm 51, and the lower end of a rod 55 is pivotally connected to the shaft 53 through a bearing 54. A guide rod 58 is connected to the upper end of the rod 55 through a spherical bearing joint 57 mounted with a pin 56. The guide rod 58 is held by means of a bearing 39b within housing 39 so that the guide rod 58 moves freely vertically.

A bracket 60 is secured to the upper end of the guide rod 58, and a guide rod 61 is integrally connected to the bracket 60 so that the guide rod 58 vertically extends from the guide rod 61. Both ends 63 of an upper beam 62 are fitted to the guide rod 61 so that both ends 63 can move vertically. The ends 63 are resiliently biased to the bracket 60 by means of a compression coiled spring 65 provided between the guide rod 61 and a nut 64 which is thread-mounted to the upper end of guide rod 61. The heater support 67 is mounted through a plurality of adjusting bolts 66 to the underside of the upper beam 62.

When the arm 51 is rotated together with the main spindle 31, a crank-piston motion is transferred from the arm 51 to the guide rod 58 through the rod 55, causing both the guide rod 58 and the cutting edge 69 to move vertically with the upper beam 62. When the heated edge 69 is lowered midway, a compression motion occurs in the spring 65, generating a biasing force at the tip of the cutting edge 69.

The housing 39 is fitted with a spring loaded portion 72 by bolts 71 connected to a tension coiled spring 73. The upper end of the spring 73 engages the loaded portion 72 and the lower end of the spring 73 engages a spring loaded portion 74 mounted to the lower portion of the rod 55. The tension coiled spring 73 lightens and facilitates the vertical rising motion of the upper seal bar 47, support beam 42, upper beam 62, and heater support 67.

As particularly shown in the plan view of FIG. 6, one end of the guide plate 87 is secured to a corresponding end of the upper seal bar 47 through a mounting plate 91 using bolts 92. A guide plate holding portion 94 is provided at the other end of the upper seal bar 47 through a mounting plate 93. The other end of the guide plate 87 is slidably fitted to the guide plate holding portion 94, thus making it possible to accommodate differences in coefficient of thermal expansion between the upper seal bag 47 and the guide plate 87.

SUMMARY OF MAJOR ADVANTAGES OF THE INVENTION

After reading and understanding the foregoing inventive bag making machine sealer slitter apparatus, in conjunction with the drawings, it will be appreciated that several distinct advantages of the subject invention are obtained.

Without attempting to set forth all of the desirable features of the instant bag making machine sealer slitter apparatus, at least some of the major advantages of the invention include minimization of interruptions to a bag making machine operation. The cutting edge 69 is heated to an operating temperature greater than the operating temperature of the pair of upper seal bars 47. The higher temperature of the cutting edge 69 facilitates removal of carbon by-products, which may be present from a partially melted thermoplastic resin film, by means of combustion. Removal of the carbon by-products by combustion obviates the need to interrupt a bag making machine cycle to clean the cutting edge 69, thereby increasing overall machine efficiency.

Since the cutting edge 69 is substantially free of any residue from a thermoplastic resin film, the sharpness of the kerf associated with severance of a web of thermoplastic resin film is continuously maintained.

Vertical retraction of the cutting edge 69 between and above the legs of an upper seal bar 47 minimizes radiant heat transfer from the cutting edge 69 to the upper seal bar 47. By minimizing this heat transfer, the lower seal bar 47 maintains a relatively constant operating temperature, encouraging high quality weld beads.

Guide plates 87 direct the descending cutting edge 69 between the two legs of the upper seal bar 47. The guide plates 87 insure that the cutting edge 69 transversely severs the web of thermoplastic resin film 11 substantially parallel to the weld beads already formed by the sealing means.

What is claimed is:

1. A sealer slitter apparatus for a bag making machine operable to produce thermoplastic resin film bags, said sealer slitter apparatus comprising:
    sealing means for applying heat to and transversely sealing together two opposing layers of a tubular web of thermoplastic resin film, said sealing means including,
        at least one stationary lower seal bar positioned beneath and extending transversely across an intended path of travel of a tubular web of thermoplastic resin film, said at least one stationary lower seal bar comprising a U-shaped seal bar,
        at least one upper seal bar positioned above, mutually opposed to and in vertical alignment with said stationary lower seal bar, wherein a tubular web of thermoplastic resin film may be operably fed between said upper and said lower seal bars,
        a seal bar reciprocating mechanism operable to impart selective vertical motion to said upper seal bar toward and away from said stationary lower seal bar and operably provide contact with a tubular web of thermoplastic resin film between said upper and said lower seal bars,
        means for heating said lower and said upper seal bars to thereby induce a sealing weld bead to be formed transversely across a tubular web of thermoplastic resin film when said upper seal bar is lowered onto said lower seal bar with a tubular web of thermoplastic resin film therebetween, and
        said stationary lower seal bar and said upper seal bar being coated with a covering on the surfaces which operably contact a tubular web of thermoplastic resin film to minimize adherence of a thermoplastic resin film to said seal bars; and
    slitting means operably connected to said sealing means and being positioned adjacent to but spaced from said sealing means, said slitting means including,
        a cutting edge for transversely severing a tubular web of thermoplastic resin film adjacent to and substantially parallel with a weld bead, thereby dividing a tubular web of thermoplastic resin film into two portions and forming a bag of a predetermined length with a transverse seal at one end, said cutting edge being vertically recessed above said upper seal bar when said upper seal bar is withdrawn from said lower seal bar so that radiant heat emanating from said cutting edge does not increase the operating temperature of said upper seal bar, thereby adversely affecting the integrity of the transverse weld beads induced by said sealing means,
        a cutting edge reciprocating mechanism operably connected to said cutting edge to impart selective vertical motion to said cutting edge toward and away from said stationary lower seal bar and allowing said cutting edge to contact and transversely sever a tubular web of thermoplastic resin film while said sealing means induces a weld bead to the tubular web of thermoplastic resin film,
        cutting edge heating means connected to said cutting edge for heating said cutting means, and
        said cutting edge heating means providing heat input to said cutting edge such that the operating temperature of said cutting means is greater than the operating temperature of said sealing means and any carbon residue adhering to said cutting edge is removed by combustion.

2. A sealer slitter apparatus for a bag making machine operable to produce thermoplastic resin film bags as defined in claim 1 wherein said at least one stationary lower seal bar comprises: a U-shaped seal bar positioned beneath and extending transversely across a tubular web of thermoplastic resin film.

3. A sealer slitter apparatus for a bag making machine operable to produce thermoplastic resin film bags as defined in claim 2 wherein said at least one upper seal bar comprises:
    two mutually parallel seal bars positioned above and opposite to upwardly extending legs of said U-shaped seal bar, such that when a tubular web of thermoplastic resin film lies between said U-shaped stationary lower and said two mutually parallel upper seal bars, the upper seal bars are operable to vertically reciprocate toward and away from the legs of said U-shaped stationary lower seal bar, thereby imparting two parallel transverse weld beads to a web of thermoplastic resin film between said upper and said lower seal bars.

4. A sealer slitter apparatus for a bag making machine operable to produce thermoplastic resin film bags as defined in claim 3 wherein:
    said cutting edge is positioned between said two mutually parallel upper seal bars and transversely severs a tubular web of thermoplastic resin film adjacent to and between the two parallel transverse weld beads thereby dividing the tubular web of thermoplastic resin film into two portions and forming in sequence bags of a predetermined length with transverse seals at both ends.

5. A sealer slitter apparatus for a bag making machine operable to produce thermoplastic resin film bags as defined in claim 3 and further comprising:

guide means connected to each of said two mutually parallel seal bars for directing said cutting edge so that vertical advancement and retraction of said cutting edge may be laterally controlled, said guide means providing precise positioning of said cutting edge, relative to said parallel weld beads formed by said sealing means, for severing the tubular web of thermoplastic resin film along a line between and substantially parallel with said weld beads.

6. A sealer slitter apparatus for a bag making machine operable to produce thermoplastic resin film bags as defined in claim 1 or 4 wherein said seal bar heating means comprises:

a first heater positioned within said stationary lower seal bar to provide sufficient heat such that said heat will conduct to the surface of said stationary lower seal bar and be sufficient to melt a tubular web of thermoplastic resin film upon contact of said lower seal bar and the tubular web of thermoplastic resin film; and a second heater positioned withing said upper seal bar to provide sufficient heat such that said heat will conduct to the surface of said upper seal bar and be sufficient to melt a web of thermoplastic resin film upon contact of said upper seal bar and the tubular web of thermoplastic resin film.

* * * * *